Oct. 9, 1962  H. J. STRAUSS  3,057,943
GAS PERMEABLE NEGATIVE ELECTRODE
Filed May 4, 1959
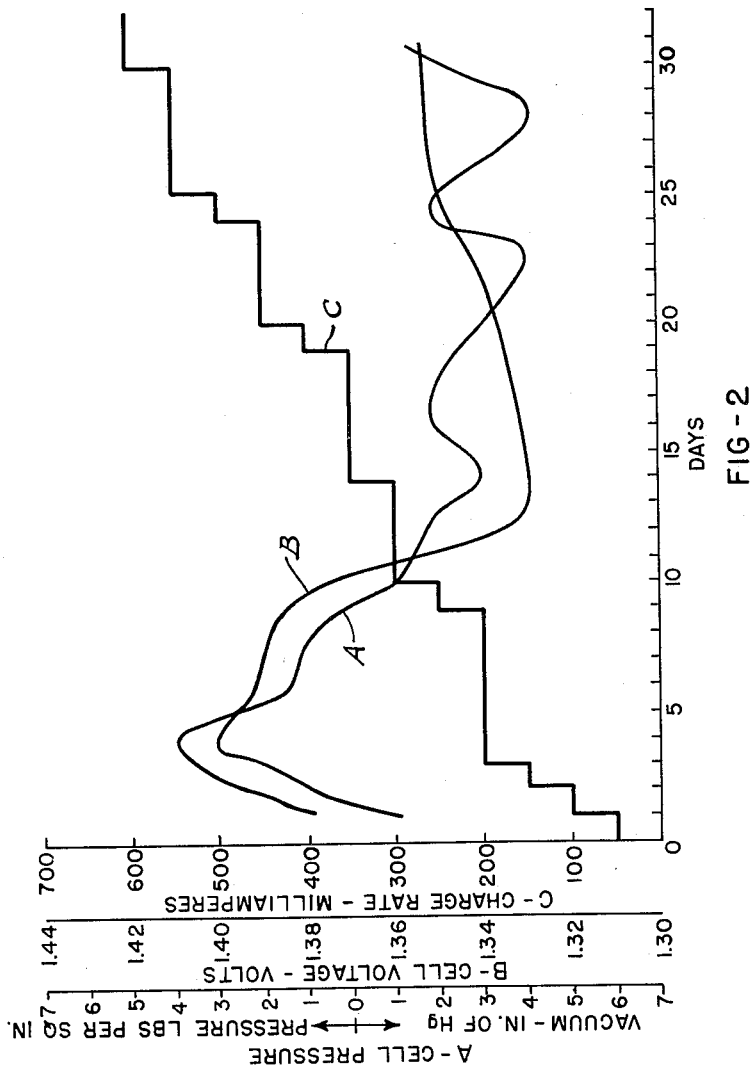
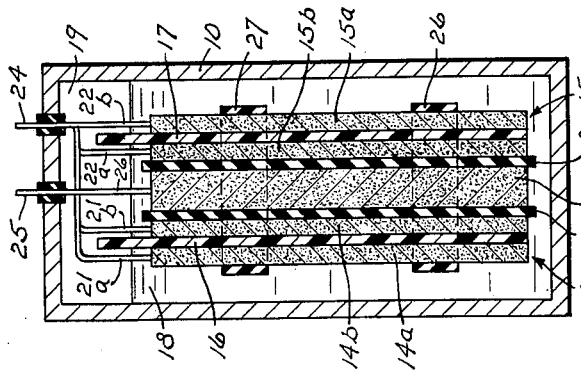
INVENTOR.
HOWARD J. STRAUSS

3,057,943
GAS PERMEABLE NEGATIVE ELECTRODE
Howard J. Strauss, Abington Township, Montgomery County, Pa., assignor to The Electric Storage Battery Company, a corporation of New Jersey
Filed May 4, 1959, Ser. No. 810,836
7 Claims. (Cl. 136—6)

The present invention generally relates to alkaline batteries of the type utilizing nickel-cadmium electrodes. More specifically, the present invention is concerned with a new and improved nickel-cadmium battery adapted to be operated within a hermetically sealed container.

It is a general object of the present invention to provide a new and improved means for facilitating the recombination of gases, evolved during battery operation, with the electrochemically active material of the electrodes in order that systems of the type described may be operated in the sealed condition.

It is known in the prior art that under certain conditions nickel-cadmium cells can be operated in a sealed container without an undue build-up of gas pressure within the container by properly proportioning the electrochemical capacities of the electrodes with respect to each other and by operating the cell with a limited amount of electrolyte, the latter being contained substantially within the pores of an absorbent separator and within the pores of the electrodes themselves. The theory of operation of a sealed cell with limited amounts of electrolyte is that by limiting the amount of electrolyte to that necessary for ion transfer between the electrodes and to that amount necesstry to provide a thin film covering the electrode pore walls, to maintain them highly electrochemically active, the effective surface of the electrodes is more readily available for direct combination with the gases liberated during cell operation. In this manner, there is maintained within the cell a balanced system which provides for gas recombination at a rate which prevents an undue build-up of gas pressure within the cell. While sealed cells of the type described have proved to be satisfactory for certain applications, they are only adapted for operation on continuous overcharge at low rates and generally have approximately 30% less capacity and shorter life than comparable unsealed cells.

It is, therefore, another object of the present invention to provide a new and improved nickel-cadmium battery which is adapted to be sealed with an excess non-critical amount of electrolyte and hence, will have the life and capacity of an unsealed battery.

Still another object of the present invention is to provide a new and improved negative electrode which will permit a sealed nickel-cadmium battery to be operated on continuous overcharge at high rates without an undue build-up of gas pressure.

In the manufacture of sealed nickel-cadmium batteries with limited electrolyte, it is the general practice to invert the cells as they approach full charge on formation to remove excess electrolyte and then to continue charging in the inverted position or to use other special procedures to arrive at a critical optimum electrolyte content. These are expensive and time consuming and not compatible with mass production techniques.

It is, accordingly, a further object of the present invention to provide a new and improved electrode system for a nickel-cadmium battery which will permit the battery to be sealed with a non-critical amount of electrolyte therein and thereby, eliminate the so-called "inverted charge" and other special procedures heretofore necessary in the manufacture of such cells.

In accordance with the present invention, there is provided a sealed nickel-cadmium battery which is adapted to be operated with an excess of electrolyte and which employs a new and improved negative plate having a large surface area in communication with the gas space within the battery and available for gas recombination. Negative plates made in accordance with the teachings of the present invention consist of two sections made in the conventional manner but each having half the thickness and capacity stipulated by cell design. These two half sections of the negative plate are then separated by a non-wetting gas permeable member. By way of example, the negative plates can be two thin, sintered nickel plaques impregnated and polarized to form cadmium electrodes and the non-wetting, gas permeable member may be a non-wetting microporous thermoplastic resin such as a sheet of microporous tetrafluoroethylene. While microporous tetrafluoroethylene has natural non-wetting characteristics, it should be understood that other materials, such as microporous polyethylene, may be utilized if treated to enhance their non-wetting characteristics. The gas permeable member is sandwiched between and held in close contact with the sections of the negative plate. Where it is desirable, pressure can be applied to the negative plate members to insure closer contact with the gas permeable member. Cells incorporating the composite negative plate just described, may be operated with an excess of electrolyte in the manner of conventional unsealed cells. In application, however, the electrolyte level should be maintained such that the gas permeable member extends above the electrolyte level into the gas chamber of the cell. This permits oxygen that may be evolved during the operation of the cell to permeate down through the permeable member and be recombined at the back surfaces of the negative plate sections with the active material of those sections during charging. As is well established, no hydrogen will be evolved at the negative electrode during charging as long as the recombination of oxygen is proceeding at the electrode at a rate equivalent to the evolution of oxygen.

By the use of the composite negative plate of the present invention, oxygen in a cell is made readily available to the negative active material and in addition, electrolyte is made accessible to the negative active material so that both the gas recombination reaction and the electrochemical reactions attending the charge and discharge of the cell can be carried out at desirable rates. In this manner, it is possible to seal cells without an undue build-up of gas pressure within the cells during operation and still provide the cells with sufficient electrolyte to carry out efficiently the electrochemical reactions of the cells.

A better understanding of the present invention may be had from the following description of the drawings of which:

FIG. 1 is a side elevation, taken in section, of an embodiment of the present invention; and FIG. 2 is a chart showing curves illustrating the performance of an embodiment of the present invention.

Referring now to the drawing, the numeral 10 designates a cell container adapted to be sealed to prevent the passage of gases either from the cell to the atmosphere or from the atmosphere to the interior of the cell. As shown, the cell container 10 contains a battery element consisting of a positive plate 11, separators 12 and 13 and a pair of composite negative electrodes 14 and 15. The negative electrode 14 comprises a pair of half sections 14a and 14b, separated by and in close contact with a gas permeable, non-wetting member 16. Similarly, the negative electrode 15 comprises a pair of half sections 15a and 15b, separated by and in close contact with a gas permeable, non-wetting member 17. As shown, the gas permeable, non-wetting members 16 and 17 extend upward above the level of the electrolyte 18 which covers the electrodes 11, 14 and 15, and into the gas space 19 at the top of the cell container 10.

The half sections of the negative electrodes 14 and 15 and the positive electrode 11 may be of the conventional form comprising plaques of highly porous sintered nickel impregnated with active material. The impregnation may be accomplished in solutions of nickel and cadmium salts respectively and the plaques subsequently polarized in a suitable electrolyte. The sections of the negative plates 14 and 15 are joined by conductors 18a and 18b, and 19a and 19b, to the negative terminal 21. The positive plate 11 is electrically connected to the positive terminal 22 by means of the conductor 23. The terminals 21 and 22 extend through the container 10 and are sealed therein.

In operation, the gas permeable members 16 and 17 provide electrolyte free passages through which oxygen, evolved at the positive plate during overcharge and collected in the gas space 19, may permeate to contact the active material of the negative plate and be combined therewith. Accordingly, it is essential that the gas permeable members 16 and 17 be non-wetting in alkaline electrolyte in order that the pores therein do not absorb electrolyte and cease to function as gas passages. In this respect, it has been found that porous or microporous thermoplastic resins, because of their sleek, relatively slippery and wax-like surfaces, are well adapted for this purpose. My particular preference for thermoplastic resins are the fluorinated hydrocarbons such as tetrafluoroethylene and trifluorochlorethylene, which are, by nature, highly non-wetting. It should be understood, however, that other thermoplastic resins which by nature are less non-wetting may be treated with conventional non-wetting agents to make them suitable for use in the present invention. Examples of such thermoplastic resins are polyethylene and polypropylene. It should also be understood that it is not necessary that the gas permeable member 16 be a thermoplastic resin. In this respect, it is within the scope of the present invention to utilize any material which is gas permeable and non-wetting in electrolyte. An example of a non-resinous material suitable for use as the member 16 is a sheet of porous ceramic material which has been treated so as to be non-wetting.

In understanding the advantages of the present invention, it is essential to appreciate that the provision of means for efficiently accomplishing gas recombination within a sealed cell has been provided without the necessity of limiting the amount of electrolyte within the cell as is the case of conventional prior art sealed cells. The principal problem encountered in the construction of sealed cells having limited amounts of electrolyte is the dissipation of heat generated within the cell during operation. In unsealed cells and in the sealed cell of the present invention which may be flooded with electrolyte, the electrolyte not only transfers heat from the electrodes to the cell container for dissipation but because of its thermal capacity and volume, it also acts as a sink. When the amount of electrolyte within a cell is limited, there is not a sufficient amount of electrolyte available to contribute substantially to the dissipation of cell heat. As a result, when the elements of the conventional sealed cells are operated at high rates, they tend to become hot, causing the water in the electrolyte to vaporize. Since the cell containers are generally at the lower temperatures than the cell elements, this water will condense on the walls of the cell containers causing the cells to become further starved for electrolyte. Accordingly, the size and current capacity of prior art sealed cells is severely limited.

Referring now to FIG. 2, there is shown a graph illustrating the performance of a cell made in accordance with the teachings of the present invention. The cell in question contained four positive electrodes and five negative electrodes. The positive plates were conventional electrodes comprising sintered nickel plaques impregnated with conventional nickel oxide active material. These electrodes were 2 inches by 4 inches square and 0.075 inch thick. The negative electrodes each consisted of two sintered nickel plaques impregnated with conventional cadmium active material separated by and in contact with a sheet of microporous tetrafluoroethylene. Each of the negative plate sections was 2 inches by 4 inches square and 0.025 inch thick. The gas permeable members were 2 inches by 4½ inches square and ⅛ inch thick and extended approximately ½ inch above the negative plate sections. The cell was assembled in normal fashion and was filled with conventional potassium hydroxide electrolyte having a specific gravity of 1,240 in an amount sufficient to cover the electrodes but not the gas permeable members. The cell had a capacity of 1.96 ampere hours at a discharge rate of 1.40 amperes.

As shown by curve C in FIG. 2, the cell was maintained on continuous overcharge for a period of 30 days with the charge rate increased intermittently from 50 milliamperes to 650 milliamperes. As can be seen from curve B, the cell voltage increased during the early days of overcharge then decreased after approximately 10 days of overcharge to about a level of 1.34 volts where it remained substantially constant. As curve A shows, the pressure within the cell first increased, reaching a maximum pressure of approximately 4 pounds per square inch during the fifth day of overcharge, then decreased steadily until about the ninth day at which time vacuum conditions were developed within the cell. From the tenth day on, these vacuum conditions remained. From this curve, it can be readily seen that as the gas passages became more developed within the gas permeable members of the negative plate, gas recombination proceeded at such a rate that in place of the pressure which normally builds up within sealed cells of conventional construction, vacuum conditions prevailed within the cell. As might be expected, the cell voltage curves and the cell pressure curves substantially follow each other. A conventional sealed cell would develop an internal pressure of from 5 to 15 pounds per square inch under similar operating conditions.

In accordance with the teachings of the present invention, means have been provided to promote the recombination of oxygen evolved from the positive plate during overcharge. As long as the recombination of oxygen is proceeding at the negative electrode, no hydrogen will be evolved at that electrode. Hydrogen may be evolved, however, at the positive electrode during overdischarge or cell reversal. Accordingly, for certain applications, it may be desirable to include provisions for suppressing the evolution of hydrogen under these conditions. This can be done by providing that the positive electrodes shall attain a full state of charge prior to the negative electrodes and that the negative electrodes shall go into reversal prior to the complete discharge of the positive plates.

Having now described this invention, that which is claimed as novel is:

1. In a rechargeable battery of the type wherein the container is sealed against the passage of gases, the improvement comprising a free electrolyte surrounding the electrodes thereof and a negative electrode consisting of two sections separated from each other by and in contact with a gas permeable member non-wetting in the battery electrolyte, said gas permeable member extending above the electrolyte level within said battery.

2. In a sealed battery of the alkaline type having a gas space therein, the improvement comprising a free electrolyte and a negative electrode immersed in said electrolyte consisting of two parts separated from each other by and in contact with a gas permeable member non-wetting in alkaline electrolyte, said gas permeable member extending above the electrolyte level within said battery into said gas space.

3. The battery of claim 2 in which said gas permeable member of a porous sheet of a non-wetting thermoplastic resin.

4. The battery of claim 2 in which said gas permeable member is a porous sheet of a non-wetting thermoplastic resin selected from the group consisting of tetrafluoroethylene, trifluorochloroethylene, polypropylene and polyethylene.

5. In combination, a sealed cell container, a positive nickel electrode, a negative cadmium electrode, and an excess of free alkaline electrolyte in said container, said negative plate having two sections separated from each other by and in contact with a gas permeable non-wetting thermoplastic resin member, a gas space in said container above the level of said electrolyte, said gas permeable member extending above said electrolyte level into said gas space.

6. In combination, a sealed cell container, a positive electrode containing nickel active material, a negative electrode containing cadmium active material, a separator, and an excess of free alkaline electrolyte in said container, said negative plate having two sections separated from each other by a gas permeable non-wetting thermoplastic resin sheet, one of said sections having a face in contact with one side of said sheet, the other of said sections having a face in contact with the other side of said sheet, a gas space in said container above the level of said electrolyte, said gas permeable sheet extending above said electrolyte level into said gas space.

7. The combination of claim 6 in which the positive electrode has an excess of charged positive active material in relation to the capacity of the negative plate.

References Cited in the file of this patent

UNITED STATES PATENTS

| | | |
|---|---|---|
| 1,552,871 | Oppenheim | Sept. 8, 1925 |
| 2,862,989 | Strauss | Dec. 2, 1958 |
| 2,928,889 | Bonner et al. | Mar. 15, 1960 |
| 2,937,221 | Lindgren | May 17, 1960 |
| 2,980,745 | Peters | Apr. 18, 1961 |

FOREIGN PATENTS

| | | |
|---|---|---|
| 458,027 | Canada | July 12, 1949 |
| 741,345 | Great Britain | Nov. 30, 1955 |